(12) United States Patent
Sato

(10) Patent No.: US 6,662,433 B1
(45) Date of Patent: Dec. 16, 2003

(54) METHOD OF FABRICATING THE THIN FILM MAGNETIC HEAD

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 276 days.

(21) Appl. No.: 09/709,767

(22) Filed: Nov. 10, 2000

Related U.S. Application Data

(62) Division of application No. 09/337,425, filed on Jun. 21, 1999, now Pat. No. 6,301,085.

(30) Foreign Application Priority Data

Jul. 2, 1998 (JP) .............................. 10-187467

(51) Int. Cl.[7] .................... G11B 5/127; H04R 31/00
(52) U.S. Cl. .............. 29/603.14; 29/603.11; 29/603.13; 29/603.15; 29/603.16; 29/603.17; 29/605; 360/121; 360/123; 360/126; 451/5; 451/41
(58) Field of Search ............... 29/603.14, 603.11, 29/603.13, 603.15, 603.16, 603.17, 605, 606; 451/5, 41; 360/121, 123, 126, 317

(56) References Cited

U.S. PATENT DOCUMENTS

| | | | |
|---|---|---|---|
| 5,535,079 A | * 7/1996 | Fukazawa et al. | 360/126 |
| 5,555,147 A | 9/1996 | Maruyama | 360/113 |
| 5,622,525 A | * 4/1997 | Haisma et al. | 451/41 |
| 5,649,351 A | * 7/1997 | Cole et al. | 29/603.14 |
| 5,661,620 A | 8/1997 | Saito et al. | 360/113 |
| 5,722,156 A | * 3/1998 | Balfrey et al. | 29/603.08 |
| 5,749,769 A | * 5/1998 | Church et al. | 451/5 |
| 5,809,636 A | * 9/1998 | Shouji et al. | 29/603.14 |
| 5,885,131 A | * 3/1999 | Azarian et al. | 451/5 |
| 6,034,848 A | * 3/2000 | Garfunkel et al. | 360/126 |
| 6,113,464 A | * 9/2000 | Ohmori et al. | 451/41 |
| 6,226,149 B1 | * 5/2001 | Dill, Jr. et al. | 360/126 |
| 6,261,468 B1 | * 7/2001 | Sato et al. | 216/22 |
| 6,317,288 B1 | * 11/2001 | Sasaki | 360/126 |
| 6,333,841 B1 | * 12/2001 | Sasaki | 360/317 |

FOREIGN PATENT DOCUMENTS

| | | |
|---|---|---|
| JP | 5-298624 | 11/1993 |
| JP | 8-241508 | 9/1996 |

* cited by examiner

*Primary Examiner*—Peter Vo
*Assistant Examiner*—Paul Kim
(74) *Attorney, Agent, or Firm*—Brinks Hofer Gilson & Lione

(57) ABSTRACT

A thin film magnetic head includes a lower shielding layer composed of a magnetic material; a nonmagnetic MR gap layer on the lower shielding layer; a magnetoresistive element layer in the MR gap layer facing a recording medium; a lower core layer composed of a magnetic material on the MR gap layer; an upper core layer composed of a magnetic material being opposed to the lower core layer with a nonmagnetic gap layer therebetween at the surface facing the recording medium; and a coil layer for inducing a recording magnetic field in the lower core layer and the upper core layer. Alternatively, a thin film magnetic head further includes a first magnetic material layer in the rear of the lower shielding layer, magnetically separated from the lower shielding layer. A method of fabricating the same is also disclosed.

6 Claims, 6 Drawing Sheets

METHOD OF FABRICATING THE THIN FILM MAGNETIC HEAD

This is a division of application Ser. No. 09/337,425 filed Jun. 21, 1999, now U.S. Pat. No. 6,301,085.

BACKGROUND OF THE INVENTION

1. Field of the Invention

The present invention is a divisional of application Ser. No. 09/337,425, filed on Jun. 21, 1999, which relates to a thin film magnetic head in which a recording head (inductive magnetic head) and a reproducing head (magnetoresistive head) are combined, and more particularly, to a thin film magnetic head in which the tip and the vicinity thereof of an upper core layer can be formed in a predetermined shape, enabling the track to be narrowed, and to a method of fabricating the same.

2. Description of the Related Art

FIG. 11 is a longitudinal sectional view of a conventional thin film magnetic head.

The thin film magnetic head is provided on the trailing end of a slider of a floating type magnetic head which faces a recording medium such as a hard disk, and is a combined thin film magnetic head in which a magnetoresistive head for reproducing, using magnetoresistance, and an inductive magnetic head for recording, are laminated.

A lower shielding layer 1 is composed of a magnetic material such as an NiFe alloy (permalloy), and a magnetoresistive element layer 2 is formed on the lower shielding layer 1 with a first gap layer (not shown in the drawing) therebetween. An upper shielding layer 3, which is composed of a magnetic material such as an NiFe alloy, is formed on the magnetoresistive element layer 2. As described above, the thin film magnetic head shown in FIG. 11 is a combined thin film magnetic head in which a magnetoresistive head and an inductive magnetic head are laminated, and the upper shielding layer 3 also functions as a lower core layer of the inductive magnetic head. Hereinafter, the layer represented by numeral 3 is referred to as a lower core layer.

A gap layer 4 (second gap layer) composed of a nonmagnetic material such as aluminum oxide ($Al_2O_3$) or silicon dioxide ($SiO_2$) is formed on the lower core layer 3. An insulating layer 5 (first insulating layer) composed of a resist or other organic material is formed on the gap layer 4.

A coil layer 6, composed of a conductive material having low electrical resistance, such as Cu, is spirally formed on the insulating layer 5. Although the coil layer 6 is formed so as to go around a base 8b of an upper core layer 8, which will be described later, only a portion of the coil layer 6 is shown in FIG. 11.

The coil layer 6 is covered by an insulating layer 7 (second insulating layer) composed of an organic material or the like, and the upper core layer 8 is formed on the insulating layer 7 by plating a magnetic material such as a permalloy. The tip 8a of the upper core layer 8 is joined to the lower core layer 3 with the gap layer 4 therebetween at the section facing a recording medium to form a magnetic gap having a gap length Gl. The base 8b of the upper core layer 8 is magnetically connected to the lower core layer 3 through a hole made in the gap layer 4.

In the inductive magnetic head for writing, when a recording current is applied to the coil layer 6, a recording magnetic field is induced in the lower core layer 3 and the upper core layer 8, and a magnetic signal is recorded onto a recording medium such as a hard disk by means of a leakage magnetic field from the magnetic gap between the lower core layer 3 and the tip 8a of the upper core layer 8.

In the thin film magnetic head shown in FIG. 11, the coil layer 6 has a double-layered structure. The double-layered structure is employed for the purposes of enhancing writing efficiency by shortening the magnetic path formed over the lower core layer 3 and the upper core layer 8, and reducing inductance.

FIG. 12 is a longitudinal sectional view which shows a step of fabricating the upper core layer 8 of the thin film magnetic head shown in FIG. 11.

The upper core layer 8 of the thin film magnetic head shown in FIG. 11 is formed by frame plating. As shown in FIG. 12, after the coil layer 6 is formed and is covered by the insulating layer 7, an underlying layer 9 composed of a magnetic material such as an NiFe alloy is formed from on the gap layer 4, which is exposed around the tip, to on the insulating layer 7.

Next, after a resist layer 10 is formed on the underlying layer 9, a pattern of the upper core layer 8 is formed on the resist layer 10 by exposure and development, and a magnetic material layer (upper core layer 8) is formed by plating on the section in which the resist 10 is removed and the underlying layer 9 is exposed. When the remaining resist layer 10 is removed, the upper core layer 8 is completed. In the final step, by removing the thin film laminate on the left side of the line A—A (shown by dotted lines in the drawing), the thin film magnetic head having the shape shown in FIG. 11 can be obtained.

However, in the structure of the conventional thin film magnetic head as shown in FIG. 11, when the upper core layer 8 is formed by frame plating, narrowing of the track cannot be realized.

As shown in FIG. 11, by forming the coil layer 6 having a double-layered structure, the total thickness of the insulating layers 5 and 7 which cover the coil layer 6 is increased, and in such a state, as shown in FIG. 12, when the resist layer 10 is formed from on the gap layer 4 around the tip in which the insulating layers 5 and 7 are not formed to on the insulating layer 7, the thickness tl of the resist layer 10 formed on the gap layer 4 is significantly increased. On the gap layer 4, as shown in FIG. 11, the tip 8a of the upper core layer 8 is formed. The tip 8a is narrowly shaped as shown in the plan view of FIG. 13, and the width of the tip 8a determines a track width Tw. In particular, as recording density is increased, the track width Tw must be further decreased, and the pattern of the resist layer 10 must be formed with particular precision when the tip 8a and its vicinity of the upper core layer 8 are formed.

However, as shown in FIG. 12, since the thickness tl of the resist layer 10 on the gap layer 4, in which the tip 8a of the upper core layer 8 is to be formed, is significantly increased, when the wavelength of a light source for exposure is decreased and the depth of focus is increased, resolution (resolving power) is degraded and the track width Tw having a predetermined size cannot be obtained; it is thus not possible to meet the need for narrowing of a gap. In order to improve resolution, a smaller depth of focus is better.

Another reason for not being able to realize narrowing of the track is that since the thickness tl of the resist layer 10 formed on the gap layer 4 differs greatly from that of the resist layer 10 formed on the insulating layer 7, irregular reflection may occur during exposure and development because of differences in focus.

FIG. 14 is a longitudinal sectional view of another conventional thin film magnetic head.

In FIG. 14, a lower shielding layer 11 is partially formed only around the tip, and a magnetoresistive element layer 12 is formed on the lower shielding layer 11. A lower core layer 13 (upper shielding layer) is formed from on the magnetoresistive element layer 12 and to in the rear of the lower shielding layer 11. A coil layer 14 is formed on the lower core layer 13, and an upper core layer 15 is formed so as to face the lower core layer 13 at the tip and to extend over an insulating layer 17 formed on the coil layer 14.

In the conventional example, the lower shielding layer 11 is partially formed only around the tip, and in the rear of the lower shielding layer 11, the lower core layer 13 is lowered to the same level as that of the lower shielding layer 11 through an inclined plane 13a. As shown in FIG. 14, the coil layer 14 is formed from on the inclined plane 13a to on the lower core layer 13 lying in the rear of the inclined plane 13a. Therefore, the insulating layer 17 is formed on the coil layer 14, being swollen from the surface S of the lower core layer 13 in the tip section by height t5, and the height t5 is smaller than the total thickness of the insulating layers 5 and 7 of the thin film magnetic head shown in FIG. 11. Accordingly, the thickness of a resist layer (not shown in the drawing; refer to numeral 10 in FIG. 12), which is formed on the lower core layer 13 around the tip, is not extremely increased, and in comparison with the thin film magnetic head shown in FIG. 11, a tip 15a of the upper core layer 15 can be easily formed in a predetermined shape.

In the thin film magnetic head shown In FIG. 14, however, the following problems may occur.

Generally, when a thin film magnetic head is formed, a plurality of thin film magnetic heads is simultaneously formed on a substrate 16 and by dividing into the individual thin film magnetic heads in the end, the thin film magnetic head shown in FIG. 14 can be obtained. That is, first, a plurality of lower shielding layers 11 is formed on the substrate 16, and a magnetoresistive element layer 12 is formed on each lower shielding layer 11 with an insulating layer (not shown in the drawing) therebetween. Next, a resist layer is applied onto a plurality of magnetoresistive element layers 12, and a track width Tw of the magnetoresistive element layer 12 is determined by exposure and development.

However, as described above, a plurality of magnetoresistive element layers 12 is placed on the substrate 16, and when the resist layer is, for example, spin-coated thereon, the surface onto which the resist layer is applied is not planar because the lower shielding layers 11 are selectively formed and there are steps between the lower shielding layers 11 and the substrate 16. Therefore, the resist layer is not formed at a uniform thickness, and a plurality of magnetoresistive element layers 12 formed on the substrate 16 cannot have a predetermined track width Tw.

In the thin film magnetic head shown in FIG. 14, the lower core layer 13 is provided with the inclined plane 13a, and the coil layer 14 is formed from on the inclined plane 13a to on the rear of the lower core layer 13. Since there is a difference in level on the inclined plane 13a on which the coil layer 14 is to be formed, the coil layer 14 is formed on the inclined plane 13a at a position that is raised upward in the drawing, and thus the thickness of the insulating layer 17 for covering the coil layer 14 must be increased. If the thickness of the insulating layer 17 is increased, it is difficult to form the tip 15a of the upper core layer 15 at a predetermined shape by frame plating, and narrowing of the track cannot be realized.

SUMMARY OF THE INVENTION

The present invention overcomes the difficulties noted above with respect to the related art. It is an object of the present invention to provide a thin film magnetic head, in which narrowing of the track is enabled by reducing the swelling of an insulating layer formed on a coil layer so that a tip of an upper core layer is formed in a predetermined shape and a magnetoresistive element layer is formed at a predetermined track width Tw, and to provide a method of fabricating the same.

In one aspect, a thin film magnetic head, in accordance with the present invention, includes a lower shielding layer composed of a magnetic material; a nonmagnetic MR gap layer formed on the lower shielding layer; a magnetoresistive element layer lying in the MR gap layer and facing a recording medium; a lower core layer composed of a magnetic material formed on the MR gap layer; an upper core layer composed of a magnetic material being opposed to the lower core layer with a nonmagnetic gap layer therebetween at the surface facing the recording medium; and a coil layer for inducing a recording magnetic field to the lower core layer and the upper core layer. The lower core layer extends from the position facing the recording medium to the rear of the magnetoresistive element layer, bends toward the lower shielding layer in the rear, and comes into magnetic contact with the lower shielding layer. The coil layer lies in the rear of a step of the back end of the lower core layer and lies magnetically between the lower shielding layer and the upper core layer. A magnetic path induced by the coil layer is formed over the lower shielding layer, the lower core layer, and the upper core layer.

In another aspect, a thin film magnetic head, in accordance with the present invention, includes a lower shielding layer composed of a magnetic material; a first magnetic material layer formed in the rear of the lower shielding layer and being magnetically separated from the lower shielding layer; a nonmagnetic MR gap layer formed on the lower shielding layer; a magnetoresistive element layer lying in the MR gap layer and facing a recording medium; a lower core layer composed of a magnetic material formed on the MR gap layer; an upper core layer composed of a magnetic material being opposed to the lower core layer with a nonmagnetic gap layer therebetween at the surface facing the recording medium; and a coil layer for inducing a recording magnetic field to the lower core layer and the upper core layer. The lower core layer extends from the position facing the recording medium to the rear of the magnetoresistive element layer, bends toward the first magnetic material layer in the rear, and comes into magnetic contact with the first magnetic material layer. The coil layer lies in the rear of a step of the back end of the lower core layer and lies magnetically between the first magnetic material layer and the upper core layer. A magnetic path induced by the coil layer is formed over the first magnetic material layer, the lower core layer, and the upper core layer.

In the above thin film magnetic head, preferably, a nonmagnetic material layer is provided between the lower shielding layer and the first magnetic material layer, and the lower shielding layer, the first magnetic material layer, and the nonmagnetic material layer have the same thickness.

In the present invention, preferably, the lower shielding layer and the first magnetic material layer are composed of different magnetic materials, and for example, the first magnetic material layer is composed of a magnetic material having higher saturation flux density and/or higher resistivity than that of the lower shielding layer.

A second magnetic material layer may be formed on the lower shielding layer or the first magnetic material layer in the rear of the coil layer, and the upper core layer is brought into contact with the second magnetic material layer.

Preferably, the second magnetic material layer is composed of a magnetic material having higher saturation flux density and/or higher resistivity than that of the lower shielding layer.

In the present invention, the coil layer may be formed in a double-layered structure, and at least the lower coil layer is placed in the rear of a step of the back end of the lower core layer, thus enabling a larger recording magnetic field and a thinner head.

In still another aspect, a method of fabricating a thin film magnetic head, in accordance with the present invention, includes the steps of: forming a lower shielding layer composed of a magnetic material by frame plating; forming a first gap layer on the lower shielding layer and forming a magnetoresistive element layer thereon for facing a recording medium; making a hole in the first gap layer in the rear of the magnetoresistive element layer so as to reach the lower shielding layer and forming a lower core layer extending from the hole to on the magnetoresistive element layer by frame plating; forming a second gap layer composed of a nonmagnetic material from on the lower core layer to on the first gap layer formed in the rear of the lower care layer; forming a first insulating layer on the first gap layer in the rear of the lower core layer with the second gap layer therebetween and forming a coil layer on the first insulating layer; and forming a second insulating layer on the coil layer, and then forming an upper core layer from on the gap layer formed on the lower core layer to on the second insulating layer by frame plating.

Alternatively, a method of fabricating a thin film magnetic head, in accordance with the present invention, includes the steps of: forming a lower shielding layer composed of a magnetic material and a first magnetic material layer lying in the rear of the lower shielding layer by frame plating; forming a first gap layer on the lower shielding layer and the first magnetic material layer, and forming a magnetoresistive element layer thereon for facing a recording medium; making a hole in the first gap layer in the rear of the magnetoresistive element layer so as to reach the first magnetic material layer and forming a lower core layer extending from the hole to on the magnetoresistive element layer by frame plating; forming a second gap layer composed of a nonmagnetic material from on the lower core layer to on the first gap layer formed in the rear of the lower care layer; forming a first insulating layer on the first gap layer in the rear of the lower core layer with the second gap layer therebetween and forming a coil layer on the first insulating layer; and forming a second insulating layer on the coil layer, and then forming an upper core layer from on the gap layer formed on the lower core layer to on the second insulating layer by frame plating.

The method may include the steps of forming a nonmagnetic material layer between the lower shielding layer composed of a magnetic material and the first magnetic material layer in the rear of the lower shielding layer, and grinding the lower shielding layer, the first magnetic material layer, and the nonmagnetic material layer down to the same thickness.

Before the second gap layer is formed, a hole may be made in the first gap layer on the lower shielding layer or the first magnetic material layer in the rear of the section in which the coil layer is formed, a second magnetic material layer may be formed by frame plating, and the upper core layer may be formed so as to be brought into contact with the second magnetic material layer through the hole.

Furthermore, the coil layer may be formed in a double-layered structure, and at least the lower coil layer may be formed in the rear of the lower core layer.

Preferably, the first magnetic material layer and the second magnetic material layer are composed of a magnetic material having higher saturation flux density and/or higher resistivity than that of the lower shielding layer.

In the present invention, a lower core layer (upper shielding layer) is partially formed only around the tip of a thin film magnetic head, the lower core layer bends perpendicularly on the back of a magnetoresistive element layer to form a step, and the lower core layer is brought into contact with a lower shielding layer or a first magnetic material layer. A coil layer is formed in the rear of the lower core layer that is bent perpendicularly, and thus the swelling of an insulating layer for covering the coil layer can be decreased in relation to the surface of the lower core layer exposed around the tip. Therefore, in the present invention, a resist layer used when an upper core layer is formed can be formed thinly without a large difference in the film thickness from on the lower core layer exposed around the tip to on the insulating layer covering the coil layer. The tip of the upper core layer formed on the lower core layer exposed around the tip is an important section for determining a track width Tw, and in the present invention, the tip of the upper core layer can be properly formed in a predetermined shape, thus meeting the demand to narrow the track.

Next, differences between the structure of a thin film magnetic head in the present invention and that of the conventional thin film magnetic head shown in FIG. 14 will be described.

In the present invention, in the manner same as that in the thin film magnetic head shown in FIG. 14, a lower shielding layer may be formed only around the tip, and as a specific structure, a thin film magnetic head shown in FIG. 2 may be presented.

A difference between the present invention and the conventional thin film magnetic head shown in FIG. 14 is that in the present invention, as shown in FIG. 2, in the rear of a lower shielding layer 30, a first magnetic material layer 31 having the same height as that of the lower shielding layer 30 is formed with a predetermined distance L2 therebetween, and in contrast, in the conventional thin film magnetic head shown in FIG. 14, in the rear of the lower shielding layer 11, the lower core layer 13 is formed by lowering its position through the inclined plane 13a.

In the present invention, after the lower shielding layer 30 and the first magnetic material layer 31 are formed, a nonmagnetic material layer 32 composed of $Al_2O_3$ or the like is formed between the lower shielding layer 30 and the first magnetic material layer 31, and surfaces of the lower shielding layer 30, the first magnetic material layer 32, and the nonmagnetic material layer 32 are planarized. A magnetoresistive element layer 22 formed on the lower shielding layer 30 is formed into a predetermined shape by a resist layer (not shown in the drawing). Since the resist layer is applied onto the planarized lower shielding layer 30, first magnetic material layer 31, and nonmagnetic material layer 32, the resist layer can be formed at a uniform thickness, and therefore, the magnetoresistive element layer 22 can be formed at a predetermined track width Tw by the resist layer.

In contrast, in the conventional thin film magnetic head shown in FIG. 14, only the lower shielding layer 11 is partially formed on the substrate, and when a resist layer (not shown in the drawing) for forming the magnetoresistive element layer 12 into a predetermined shape is applied onto the lower shielding layer 11, because of a difference in level between the substrate 16 and the lower shielding layer 11, the resist layer cannot be formed at a uniform thickness, resulting in strain in the magnetoresistive element layer 12, and thus the track width Tw of the magnetoresistive element layer 12, which must be formed with particular precision, cannot be formed properly.

In the thin film magnetic head shown in FIG. 14, since the inclined plane 13a is provided in the lower core layer 13, a difference in level easily occurs in the section in which the coil layer 14 is formed in the rear of the lower core layer 13. In the present invention, as shown in FIG. 2, since the lower core layer 33 is formed perpendicularly from the first magnetic material layer 31, a coil layer 27 formed in the rear of the lower core layer 33 can be formed on a planarized first gap layer 23 with a second gap layer 25 and an insulating layer 26 therebetween, and thus, the formation of the coil layer 27 is facilitated and the swelling of an insulating layer 28 formed on the coil layer 27 can be reduced as much as possible.

DESCRIPTION OF THE PREFERRED EMBODIMENTS

Figure 1:
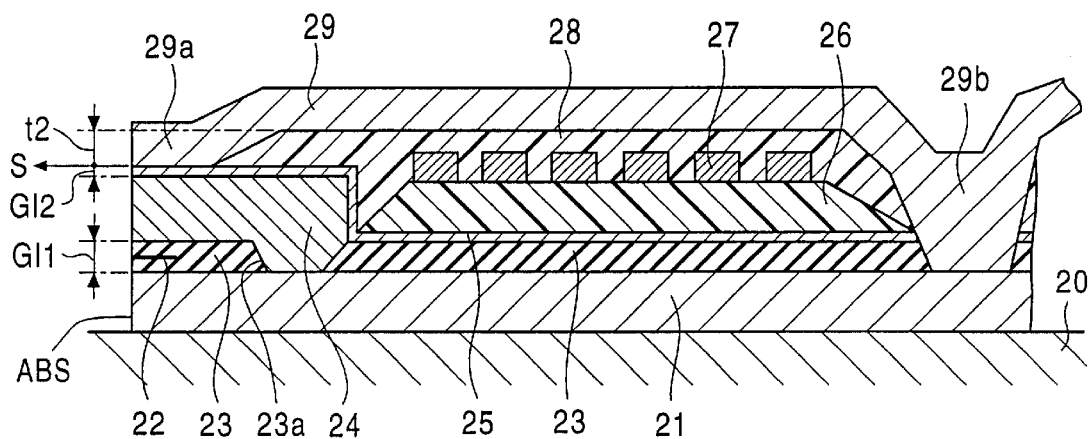
FIG. 1 is a longitudinal sectional view of a thin film magnetic head as a first embodiment of the present invention.

FIG. 1 a longitudinal sectional view of a thin film magnetic head as a first embodiment of the present invention.

A thin film magnetic head shown in FIG. 1 is a so-called "combined thin film magnetic head" in which a reproducing head (magnetoresistive head) using magnetoresistance and an inductive magnetic head for recording are laminated. The left end in the drawing shows a surface being opposed to a recording medium, i.e., air bearing surface (ABS).

A lower shielding layer 21 composed of a magnetic material such as an NiFe alloy is formed on a substrate 20. An MR gap layer 23 (first gap layer) is formed on the lower shielding layer 21, and a magnetoresistive element layer 22 is formed being interposed between the gap layers 23 on the tip side of the lower shielding layer 21 (on the side facing the recording medium; on the ABS side). As the magnetoresistive element layer 22, for example, a giant magnetoresistive (GMR) element represented by a spin-valve element or an anisotropic magnetoresistive (AMR) element may be selected. As shown in FIG. 1, the thickness of the gap layer 23 corresponds to a gap length Gl1.

In the present invention, as shown in FIG. 1, a hole 23a, which passes through the gap layer 23 and reaches the lower shielding layer 21, is made in the rear of the magnetoresistive element layer 22 (on the right side in the drawing). A lower core layer 24 is formed to extend from the hole 23a to on the magnetoresistive element layer 22. The lower core layer 24 also functions as an upper shielding layer of the reproducing head. The lower core layer 24 is composed of a magnetic material such as an NiFe alloy.

As shown in FIG. 1, the lower core layer 24 extends perpendicularly from the surface of the lower shielding layer 24 and bends over the magnetoresistive element layer 22. A gap layer 25 (second gap layer) composed of an insulating material is formed from on the lower core layer 24 to on the first gap layer 23. As shown in FIG. 1, the second gap layer 25 formed on the first gap layer 23 is lowered by a right-angled step in comparison with the second gap layer 25 formed on the lower core layer 24, and an insulating layer 26 (first insulating layer) composed of a resist material or other organic material is formed on the second gap layer 25 formed at the lower level. A coil layer 27 composed of a conductive material such as Cu having low electrical resistance is spirally formed on the insulating layer 26. An insulating layer 28 (second insulating layer) composed of an organic material is formed on the coil layer 27.

In the present invention, as shown in FIG. 1, the coil layer 27 is formed in the rear of the lower core layer 24, and in particular, since the lower core layer 24 formed on the magnetoresistive element layer 22 is bent perpendicularly toward the lower shielding layer 21, a step is formed between the lower core layer 24 and the first gap layer 23. The coil layer 27 is formed at the lower level. Therefore, the second insulating layer 28 on the coil layer 27 is formed being slightly swelled by t2 from the surface S of the second gap layer 25 formed on the lower core layer 24, or is formed substantially at the same height as the surface S of the gap layer 25. Thus, the swelling of the second insulating layer 28 can be reduced in comparison with the conventional thin film magnetic head.

An upper core layer 29 composed of a magnetic material is formed from on the second gap layer 25 to on the second insulating layer 28. As shown in FIG. 1, a tip 29a of the upper core layer 29 is formed on the lower core layer 24 with the second gap layer 25 therebetween at the section facing a recording medium, and a magnetic gap having a gap length Gl2 is formed. A base 29b of the upper core layer 29 is magnetically connected to the lower shielding layer 21 through a hole made in the gap layers 23 and 25 and insulating layers 26 and 28.

The upper core layer 29 is formed by frame plating as described below. In the frame plating process, a resist layer is formed from on the second gap layer 25 formed on the lower core layer 24 to on the second insulating layer 28, and after the resist layer is exposed and developed, the upper core layer 29 is formed by plating.

In the present invention, as described above, the second insulating layer 28 on the coil layer 27 is formed being slightly swelled by t2 from the surface S of the second gap layer 25 formed on the lower core layer 24, and thus the resist layer to be formed from on the second gap layer 25 formed on the lower core layer 24 to on the second insulating layer 28 can be formed thinly at a substantially uniform thickness. Therefore, in the present invention, the depth of focus during exposure and development can be decreased and resolution can be improved. Irregular reflection due to differences in focus does not easily occur, and in particular, the narrowly shaped tip 29a of the upper core layer 29, in which the width thereof determines a track width Tw, can be formed properly in a predetermined shape, and thus narrowing of the track is enabled.

Next, material properties will be described. The lower shielding layer 21 which functions as a shield is preferably composed of a magnetic material having high permeability, such as an NiFe alloy. The lower core layer 24 functions as a core for writing and also as a shield, and is preferably composed of an NiFe alloy, the same as in the conventional magnetic head. The upper core layer 29 is preferably composed of a magnetic material having high saturation flux density (Hi-Bs) and/or high resistivity (Hi-$\rho$), such as an $Fe_{50}Ni_{50}$ alloy or FeCoNi alloy in order to improve the function as a core for recording.

In the inductive magnetic head, when a recording current is applied to the coil layer 27, a recording magnetic field is induced in the upper core layer 29, the lower shielding layer 21, and the lower core layer 24, and a magnetic signal is recorded onto a recording medium such as a hard disk by means of a leakage magnetic field from the magnetic gap between the tip 29a of the upper core layer 29 and the lower core layer 24.

Although the coil layer 27 shown in FIG. 1 has a single-layered structure, a double-layered structure may be acceptable.

Figure 2:
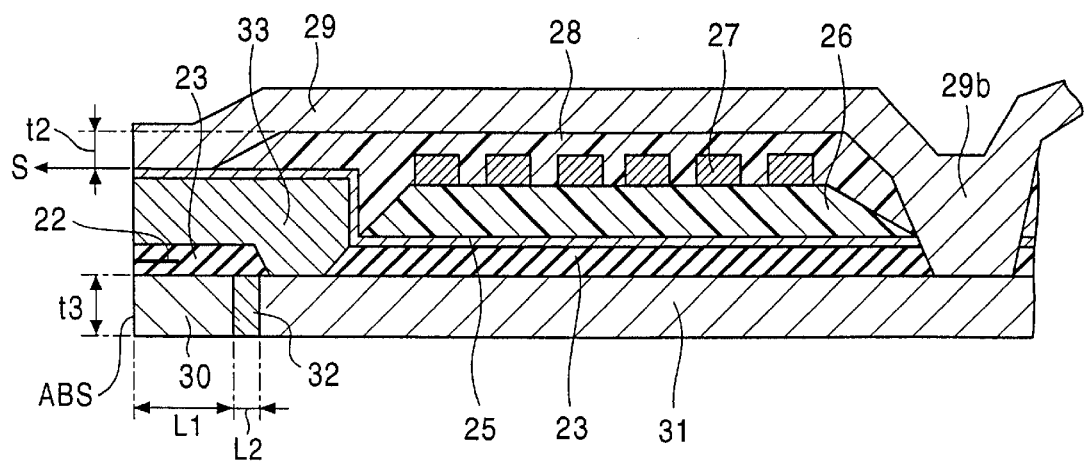
FIG. 2 is a longitudinal sectional view of a thin film magnetic head as a second embodiment of the present invention.

FIG. 2 is a longitudinal sectional view of a thin film magnetic head as a second embodiment of the present invention.

In FIG. 2, a lower shielding layer 30 is formed at a predetermined length L1 from the surface facing a recording medium (ABS) in the depth direction (in the right direction in the drawing), and a first magnetic material layer 31 is formed in the rear of the lower shielding layer 30 with a predetermined distance L2 therebetween. A nonmagnetic material layer 32 composed of a nonmagnetic material such as $Al_2O_3$ is formed in the distance L2 formed between the lower shielding layer 30 and the first magnetic material layer 31. In the present invention, the lower shielding layer 30, the nonmagnetic material layer 32, and the first magnetic material layer 31 are formed at the same height t3, and the surfaces of the individual layers are planarized.

As shown in FIG. 2, the lower core layer 33 extends perpendicularly from the first magnetic material layer 31 to over a first gap layer 23 on a magnetoresistive element layer 22.

In this thin film magnetic head, the same as in the thin film magnetic head shown in FIG. 1, a coil layer 27 is also formed in the rear of the lower core layer 33, and in particular, since the lower core layer 33 formed on the magnetoresistive element layer 22 is bent perpendicularly toward the first magnetic material layer 31, a step is formed between the lower core layer 33 and the first gap layer 23. The coil layer 27 is formed at the lower level. Therefore, a second insulating layer 28 on the coil layer 27 is formed being slightly swelled by t2 from the surface S of a second gap layer 25 formed on the lower core layer 24, or is formed substantially at the same height as the surface S of the second gap layer 25. Thus, the swelling of the second insulating layer 28 can be reduced in comparison with the conventional thin film magnetic head.

Accordingly, in the present invention, a resist layer, which is used when an upper core layer 29 is formed, can be formed thinly at a substantially uniform thickness from on the second gap layer 25 formed on the lower core layer 33 and to on the second insulating layer 28. Therefore, in the present invention, the depth of focus during exposure and development can be decreased and resolution can be improved. Irregular reflection due to differences in focus does not easily occur, and in particular, a narrowly shaped tip 29a of the upper core layer 29, in which the width thereof determines a track width Tw, can be formed properly in a predetermined shape, and thus narrowing of the track is enabled.

In the thin film magnetic head shown in FIG. 2, the lower shielding layer 30 and the first magnetic material layer 31 can be composed of different materials, and in particular, the first magnetic material layer 31 is preferably composed of a magnetic material having high saturation flux density and/or high resistivity, such as an $Fe_{50}Ni_{50}$ alloy or FeCoNi alloy.

The reason for this is that when a recording current is applied to the coil layer 27, a magnetic path is formed over the upper core layer 29, the first magnetic material layer 31, and the lower core layer 33, and the first magnetic material layer 31 functions only as a core layer of the inductive magnetic head.

In contrast, although the lower core layer 33 also functions as a core layer of the inductive magnetic head, it functions also as an upper shielding layer of the reproducing head, and therefore, the lower core layer 33 is preferably composed of an NiFe alloy or the like, the same as in the conventional magnetic head.

In the magnetic head shown in FIG. 2, since the lower shielding layer 30 and the first magnetic material layer 31 are formed with a distance therebetween, the magnetic path formed during writing does not affect the lower shielding layer 30, and therefore, the magnetic domain of the lower shielding layer 30 is not disturbed, enabling improvement in the shielding function.

In the thin film magnetic head shown in FIG. 2, although the coil layer 27 has a single-layered structure, a double-layered structure may be acceptable.

Figure 3:
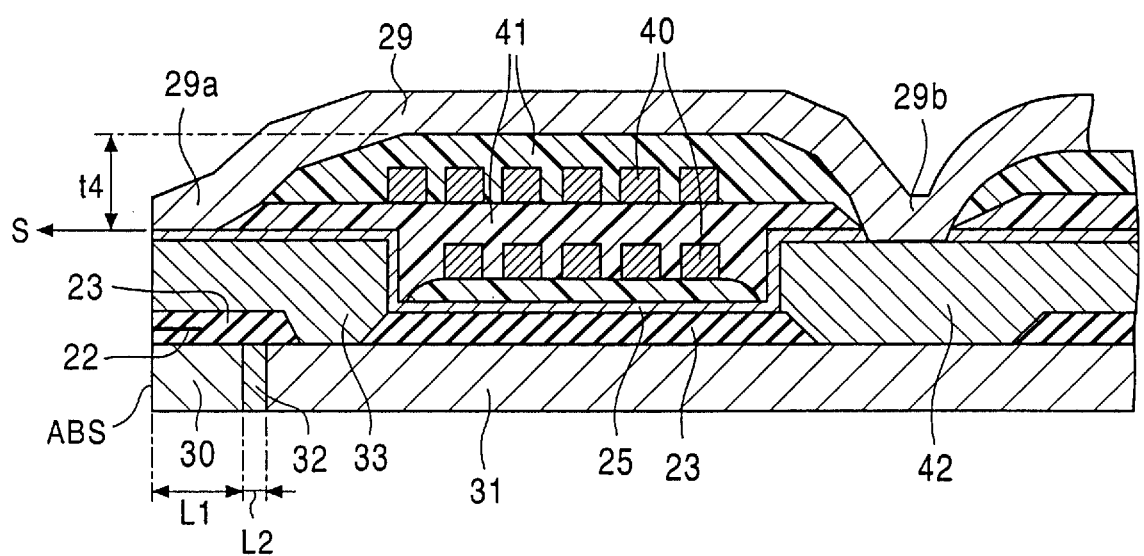
FIG. 3 is a longitudinal sectional view of a thin film magnetic head as a third embodiment of the present invention.

FIG. 3 is a longitudinal sectional view of a thin film magnetic head as a third embodiment of the present invention.

As shown in FIG. 3, in the thin film magnetic head, the same as in the thin film magnetic head shown in FIG. 2, a lower shielding layer 30 is formed at a length L1, and a nonmagnetic material layer 32 composed of a nonmagnetic material, such as $Al_2O_3$, having a length L2 is formed in the rear of the lower shielding layer 30. A first magnetic material layer 31 is formed in the rear of the nonmagnetic material layer 32. A lower core layer 33 extends perpendicularly from the first magnetic material layer 31 to over a first gap layer 23 on a magnetoresistive element layer 22.

Figure 11:
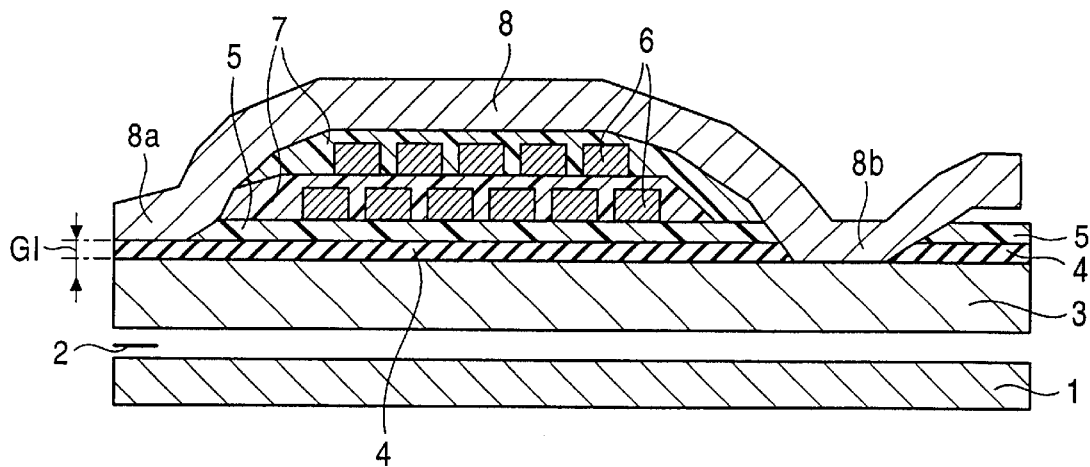
FIG. 11 is a longitudinal sectional view of a conventional thin film magnetic head.
Figure 12:
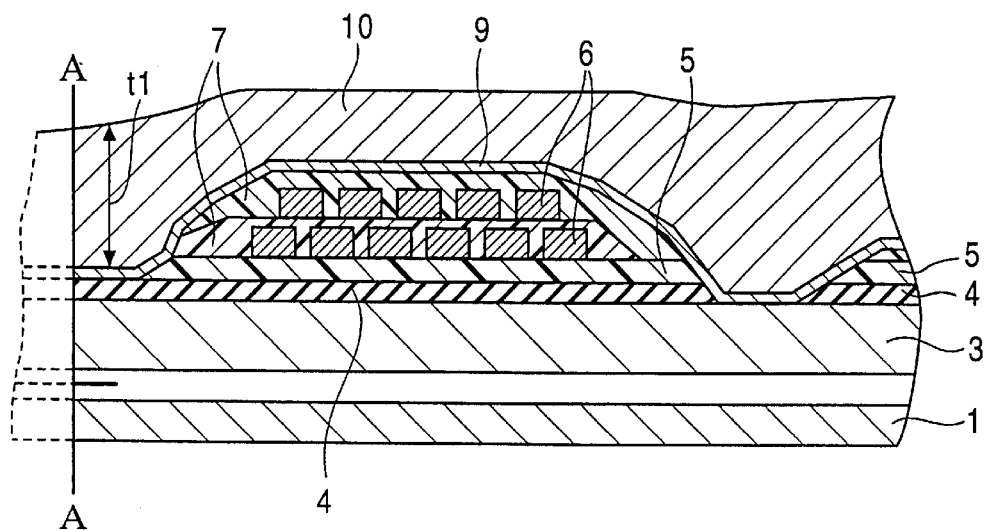
FIG. 12 is a longitudinal sectional view which shows a step of fabricating an upper core layer of the thin film magnetic head shown in FIG. 11.
Figure 13:
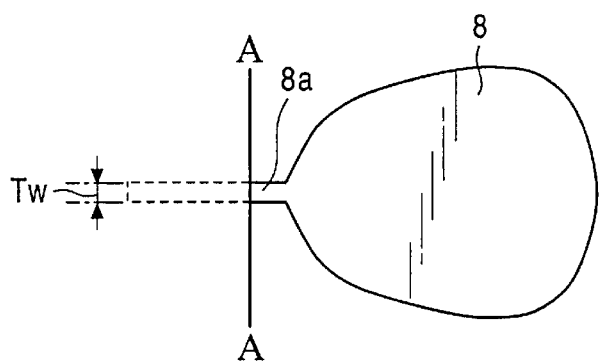
FIG. 13 is a plan view of an upper core layer.
Figure 14:
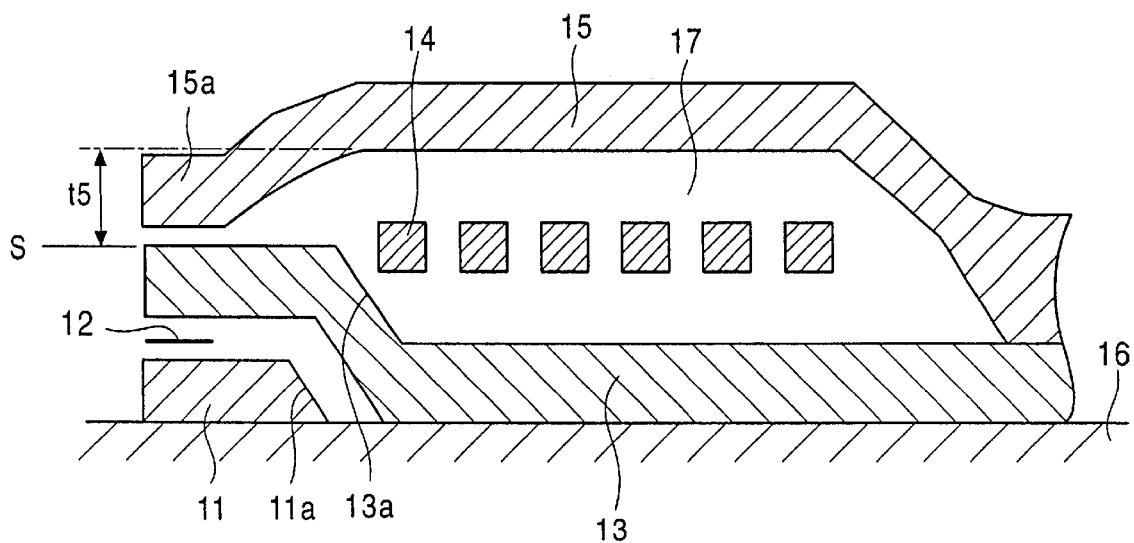
FIG. 14 is a longitudinal sectional view of another conventional thin film magnetic head.

In this embodiment, a coil layer 40 is formed in a double-layered structure, and a second insulating layer 41 for covering the coil layer 40 is formed being swelled by t4 from the surface S of a second gap layer 25 on the lower core layer 33. Since the coil layer 40 is double-layered, the height t4 of the swelling from the surface S of the gap layer 25 is larger than the height t2 shown in FIG. 1 or 2. However, in the present invention, as shown in FIG. 3, the coil layer 40 is formed in the rear of the lower core layer 33, and the coil layer 40 is formed in a recess formed by the lower core layer 33 and the first gap layer 23, and therefore, in comparison with the conventional thin film magnetic head shown in FIG. 11, the swelling of the second insulating layer 41 on the coil layer 40 can be reduced. In particular, a tip 29a of an upper core layer 29 can be formed in a predetermined narrow shape, thus meeting the demand to narrow the track.

By forming the coil 40 in a double-layered structure, a magnetic path formed over the core during writing can be shortened, thus enabling improvement in writing efficiency and reduction in inductance.

In the thin film magnetic head shown in FIG. 3, a second magnetic material layer 42 is formed at a base 29b of the upper core layer 29 between the upper core layer 29 and the first magnetic material layer 31. When the second magnetic material layer 42 is composed of the same material as that of the lower core layer 33, the fabrication process can be simplified.

However, the second magnetic material layer 42 functions only as a core for writing, and does not have the shielding function as the lower core layer 33 does. Therefore, the second magnetic material layer 42 is preferably composed of a magnetic material having high saturation flux density and/or high resistivity, such as an $Fe_{50}Ni_{50}$ alloy or FeCoNi alloy.

In the thin film magnetic head shown in FIG. 3, when a recording current is applied to the coil layer 40, a magnetic path is formed over the upper core layer 29, the second magnetic material layer 42, the first magnetic material layer 31, and the lower core layer 33.

Next, a method of fabricating a thin film magnetic head in the present invention will be described with reference to FIGS. 4 to 10. Hereinafter, a method of fabricating a thin film magnetic head as shown in FIG. 2 or 3, in which a first magnetic material layer 31 is formed in the rear of a lower shielding layer 30, will be described.

Figure 4:
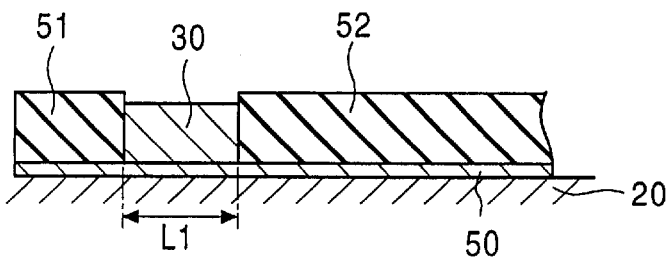
FIG. 4 is a longitudinal sectional view which shows a step of fabricating a lower shielding layer and a first magnetic material layer of a thin film magnetic head in the present invention.

First, as shown in FIG. 4, an underlying layer 50 composed of a magnetic material such as an NiFe alloy is formed on a substrate 20. Rectangular resist layers 51 and 52 are formed on the underlying layer 50 by applying a resist on the underlying layer 50, followed by exposure and development. There is a distance L1 between the resist layers 51 and 52.

A lower shielding layer 30 composed of an NiFe alloy or the like is formed by plating on the underlying layer 50 at the distance L1 in which the resist layers 51 and 52 are not formed. The process, as described above, in which the formation of an underlying layer, the formation of resist layers, exposure and development, and plating are performed, is called "frame plating".

Figure 5:
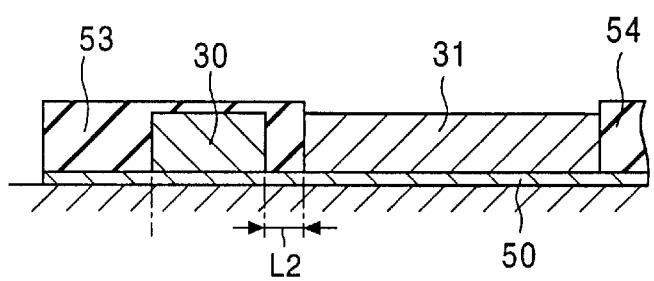
FIG. 5 is a longitudinal sectional view which shows a fabricating step performed subsequent to the step shown in FIG. 4.

Next, as shown in FIG. 5, by forming resist layers on the lower shielding layer 30 and the underlying layer 50, followed by exposure and development, a rectangular resist layer 53 is formed on the lower shielding layer 30. A rectangular resist layer 54 is also formed on the underlying layer 50 separately from the resist layer 53 with a predetermined distance therebetween.

A first magnetic material layer 31 composed of a magnetic material, preferably, having high saturation flux density and/or high resistivity, is formed by plating on the underlying layer 50 between resist layers 53 and 54.

As shown in FIG. 5, the resist layer 53 must be formed on the lower shielding layer 30 so as to leave a predetermined distance L2 between the lower shielding layer 30 and the first magnetic material layer 31. As will be described below, a nonmagnetic material layer 32 is formed in the distance L2.

Figure 6:
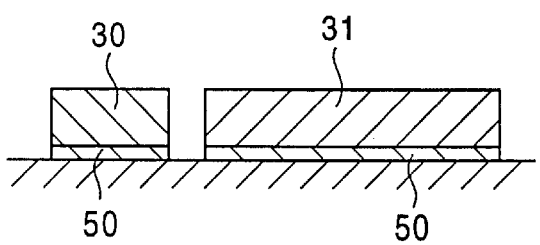
FIG. 6 is a longitudinal sectional view which shows a fabricating step performed subsequent to the step shown in FIG. 5.

Next, as shown in FIG. 6, the resist layers 53 and 54 shown in FIG. 5 are removed, and the underlying layer 50 formed beneath the resist layers 53 and 54 is removed by ion milling. That is, the underlying layer 50 remains only beneath the lower shielding layer 30 and the first magnetic material layer 31.

Figure 7:
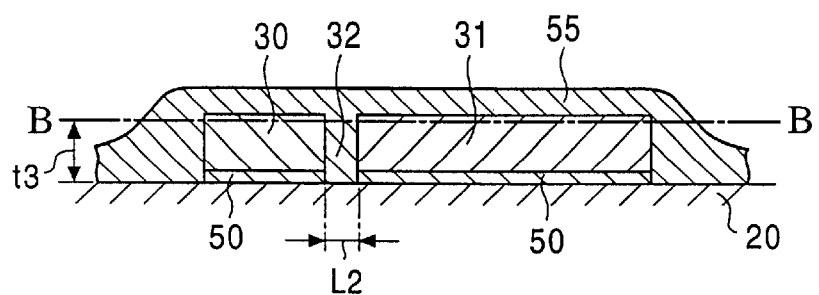
FIG. 7 is a longitudinal sectional view which shows a fabricating step performed subsequent to the step shown in FIG. 6.

As shown in FIG. 7, a nonmagnetic material layer 55 composed of $Al_2O_3$ or the like is formed on the lower shielding layer 30, the first magnetic material layer 31, and the substrate 20, and the surface of the nonmagnetic material layer 55 is ground by CMP, and furthermore, the surfaces of the lower shielding layer 30 and the first magnetic material layer 31 are ground down to the line B—B. By this step, a nonmagnetic material layer 32 can be formed between the lower shielding layer 30 and the first magnetic material layer 31, and also the lower shielding layer 30, the first magnetic material layer 31, and the nonmagnetic material layer 32 can be formed at the same height t3.

Figure 8:
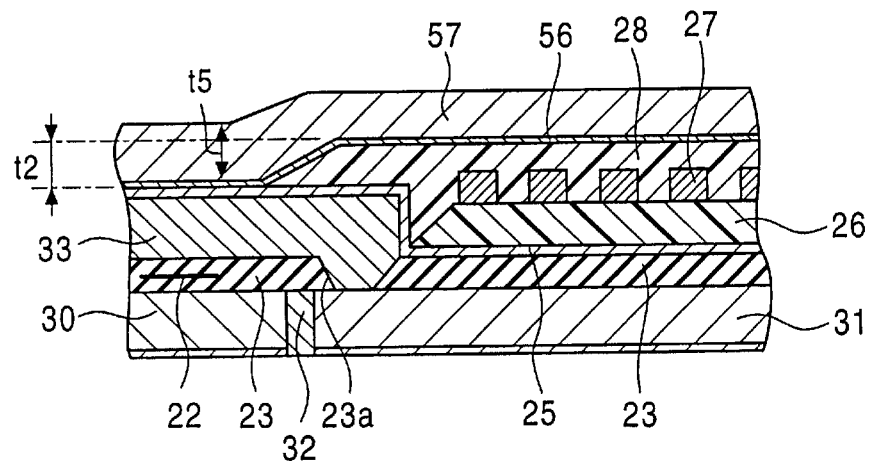
FIG. 8 is a longitudinal sectional view which shows a step of fabricating an upper core layer of a thin film magnetic head in the present invention.

Next, as shown in FIG. 8, a first gap layer 23 is formed on the planarized lower shielding layer 30, the nonmagnetic material layer 32, and the first magnetic material layer 31, and a magnetoresistive element layer 22 is formed on the first gap layer 23 on the lower shielding layer 30.

A resist layer (not shown in the drawing) is then formed on the magnetoresistive element layer 22, and the magnetoresistive element layer 22 is formed into a predetermined pattern by exposure and development. In the present invention, since the surfaces of the lower shielding layer 30, the nonmagnetic material layer 32, and the first magnetic material layer 31 are planarized, the resist layer for forming the magnetoresistive element layer 22 into a predetermined shape can be formed at a uniform thickness, and thus a track width Tw of the magnetoresistive element layer 22 can be formed at a predetermined size.

Next, a hole 23a is made in the first gap layer 23 so as to reach the first magnetic material layer 31 in the rear of the magnetoresistive element layer 22. The hole 23a is preferably made perpendicularly.

A lower core layer 33, which extends from the hole 23a to over the first gap layer 23 on the magnetoresistive element layer 22, is formed by frame plating. Thus, the lower core layer 33 can be formed in contact with the first magnetic material layer 31.

Next, a second gap layer 25 composed of a nonmagnetic material is formed from on the lower core layer 33 to on the first gap layer 23 in the rear of the lower core layer 33.

A first insulating layer 26 composed of an organic material is formed on the first gap layer 23 in the rear of the lower core layer 33 with the second gap layer 25 therebetween, and a coil layer 27 is spirally formed on the first insulating layer 26. A second insulating layer 28 is formed on the coil layer 27.

Next, an upper core layer 29 is formed from on the second gap layer 25 on the lower core layer 33 to on the second insulating layer 28 on the coil layer 27 by frame plating. First, as shown in FIG. 8, an underlying layer 56 composed of a magnetic material, such as an NiFe alloy, is formed from on the second gap layer 25 on the lower core layer 33 to on the second insulating layer 28 on the coil layer 27. A resist layer 57 is then formed on the underlying layer 56.

In the present invention, the lower core layer 33 is bent perpendicularly to reach the first magnetic material layer 31, and the coil layer 27 is formed in the rear of the lower core layer 33. As shown in FIG. 8, since the coil layer 27 is formed on the first gap layer 23 formed at a lower level than that of the lower core layer 33, the swelling of the second insulating layer 28 formed on the coil layer 27 can be reduced to the level which is slightly higher, by t2, than the surface of the gap layer 25 on the lower core layer 33, and therefore, the resist layer 57, which is formed from on the second gap layer 25 on the lower core layer 33 to on the second insulating layer 28 on the coil layer 27, can be formed at a substantially uniform thickness. In particular, a thickness t5 of the resist layer 57 formed on the second gap layer 25 on the lower core layer 33 can be set at substantially the same thickness as that of the resist layer 57 formed on the second insulating layer 28.

Figure 9:
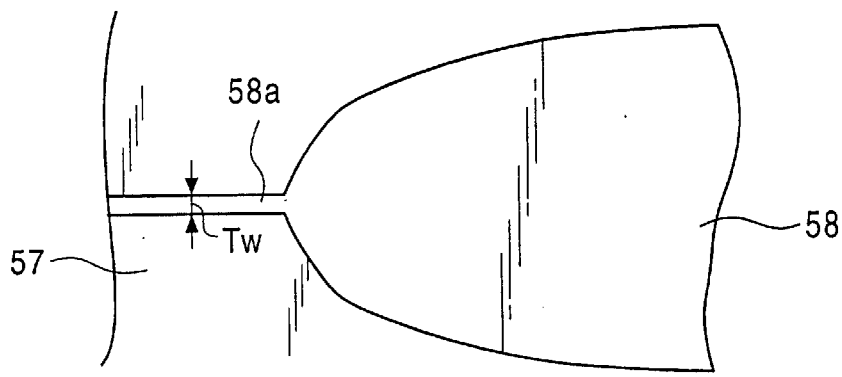
FIG. 9 is a plan view which shows a fabricating step performed subsequent to the step shown in FIG. 8.
Figure 10:
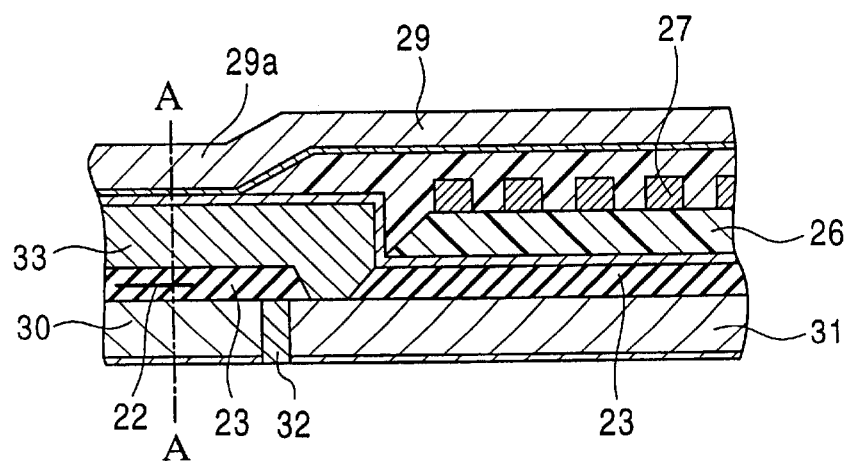
FIG. 10 is a longitudinal sectional view which shows a fabricating step performed subsequent to the step shown in FIG. 9.

Next, in FIG. 9, the resist layer 57 is exposed and developed, and the resist layer 57 which corresponds to a pattern 58 of the upper core layer 29 is removed. FIG. 9 is a plan view.

As shown in FIG. 9, a tip 58a of the pattern 58 is narrowly shaped, and the width thereof corresponds to a track width Tw. In the present invention, as described above, since the thickness of the resist layer 57 can be formed at a substantially uniform value, the pattern 58 including the tip 58a which must be formed with particular precision can be properly formed.

Next, the upper core layer 29 is plated within the pattern 58, and the remaining resist layer 57 is removed. By removing the thin film laminate on the left side of the line A—A shown in FIG. 10, a thin film magnetic head in the present invention is completed. A magnetic material used as the upper core layer 29 preferably has high saturation flux density and/or high resistivity.

Although the coil layer 27 has a single-layered structure in the fabricating method described above, the coil layer 27 may be formed in a double-layered structure, the same as the coil layer 40 shown in FIG. 3.

Furthermore, as shown in FIG. 3, the second magnetic material layer 42 may be formed between the base 29b of the upper core layer 29 and the first magnetic material layer 31.

When the second magnetic material layer 42 is composed of the same material as that of the lower core layer 33, the second magnetic material layer 42 is preferably formed by frame plating at the same time the lower core layer 33 is formed. When the second magnetic material layer 42 is composed of a different material from that of the lower core layer 33, after the lower core layer 33 is formed by frame plating in accordance with fabricating steps shown in FIGS. 4 to 6, a resist layer is formed on the lower core layer 33 to protect the lower core layer 33 and the second magnetic material layer 42 is formed by frame plating. The second gap layer 25 is then formed on the lower core layer 33, the first gap layer 23, and the second magnetic material layer 42.

The second magnetic material layer 42 is preferably composed of a magnetic material having high saturation flux density and/or high resistivity.

As described above, in the present invention, a lower core layer is formed from on a magnetoresistive element layer to, by being bent perpendicularly, on a lower shielding layer or a first magnetic material layer formed in the rear of the lower shielding layer. A coil layer is formed in the rear of the lower core layer. Thus, the swelling of an insulating layer formed on the coil layer can be reduced in relation to the surface of the lower core layer, and a resist layer for forming an upper core layer can be formed thinly at a substantially uniform thickness. Therefore, the upper core layer, in particular, the tip thereof, can be formed at a predetermined shape, thus meeting the demand to narrow the track.

In the present invention, as shown in FIG. 2, the first magnetic material layer 31 may be formed in the rear of the lower shielding layer 30 with a predetermined distance L2 therebetween. The first magnetic material layer 31 is preferably composed of a magnetic material having high saturation flux density and/or high resistivity.

In the present invention, as shown in FIG. 3, the coil layer 40 may have a double-layered structure, and the second magnetic material layer 42 may be formed between the base 29b of the upper core layer 29 and the first magnetic material layer 31. In such a case, the second magnetic material layer 42 is preferably composed of a magnetic material having high saturation flux density and/or high resistivity.

In the present invention, as described in detail, a lower core layer is formed from on a magnetoresistive element layer to, by being bent perpendicularly, on a lower shielding layer or a first magnetic material layer formed in the rear of the lower shielding layer. A coil layer is formed in the rear of the lower core layer. Thus, the swelling of an insulating layer (second insulating layer) formed on the coil layer can be reduced in relation to the surface of the lower core layer, and a resist layer for forming an upper core layer can be formed thinly at a substantially uniform thickness. Therefore, the upper core layer, in particular, the tip thereof, can be formed, by frame plating, at a predetermined track width, thus meeting the demand to narrow the track.

In the present invention, a coil layer is preferably formed in a double-layered structure, and even if the coil layer has a double-layered structure, the swelling of an insulating layer (second insulating layer) formed on the coil layer can be greatly reduced in comparison with conventional magnetic heads, and the tip of an upper core layer can be formed at a predetermined track width, thus meeting the demand to narrow the track. By forming the coil layer in a double-layered structure, a magnetic path during writing can be shortened, thus enabling the improvement in writing efficiency and the reduction in inductance.

In the present invention, when a first magnetic material layer is formed in the rear of a lower shielding layer and when a second magnetic material layer is formed between the base of an upper core layer and the lower shielding layer or the first magnetic material layer, the first magnetic material layer and the second magnetic material layer are preferably composed of a magnetic material having high saturation flux density and/or high resistivity, the same as the upper core layer.

In the present invention, surfaces of a lower shielding layer and a first magnetic material layer are planarized, and thus a resist layer, which is used when a magnetoresistive element layer on the lower shielding layer is formed at a predetermined pattern, can be formed at a uniform thickness, and the track width of the magnetoresistive element layer can be formed at a predetermined width.

In the present invention, since a lower core layer is perpendicularly bent and formed on a lower shielding layer or a first magnetic material layer and a coil layer is formed in the rear of the lower core layer, the coil layer can be formed on the planarized lower shielding layer or first magnetic material layer, and thus the coil layer can be easily formed in a predetermined shape.

What is claimed is:

1. A method of fabricating a thin film magnetic head, comprising the steps of:

forming a lower shielding layer and forming a first magnetic material layer separately from the lower shielding layer with a predetermined distance therebetween at a rear of the lower shielding layer by frame plating;

forming a first gap layer on the lower shielding layer and the first magnetic material layer, and forming a magnetoresistive element layer on the first gap layer for facing a recording medium;

making a first hole in the first gap layer in the rear of the magnetoresistive element layer so as to reach the first magnetic material layer and forming a lower core layer extending from the first hole to on the magnetoresistive element layer by frame plating;

forming a second gap layer comprising a nonmagnetic material from on the lower core layer to on the first gap layer formed in a rear of the lower core layer;

forming a first insulating layer on the first gap layer in the rear of the lower core layer with the second gap layer therebetween and forming a coil layer on the first insulating layer;

forming a second insulating layer on the coil layer, and then forming an upper core layer on the second gap layer formed on the lower core layer to on the second insulating layer by frame plating;

forming a nonmagnetic material layer between the lower shielding layer and the first magnetic material layer in the rear of the lower shielding layer; and grinding the lower shielding layer, the first magnetic material layer, and the nonmagnetic material layer down to the same thickness, wherein before the second gap layer is formed, a second hole is made in the first gap layer on the first magnetic material layer in the rear of the section in which the coil layer is formed, a second magnetic material layer is formed on the first magnetic material layer through the second hole by frame plating, and the upper core layer is formed so as to be brought into contact with the second magnetic material layer.

2. A method of fabricating a thin film magnetic head according to claim 1, wherein the coil layer is formed in a double-layered structure, and at least a lower coil layer is formed in the rear of the lower core layer.

3. A method of fabricating a thin film magnetic head, comprising the steps of:

forming a lower shielding layer and forming a first magnetic material layer separately from the lower shielding layer with a predetermined distance therebetween at a rear of the lower shielding layer by frame plating;

forming a first gap layer on the lower shielding layer and the first magnetic material layer, and forming a magnetoresistive element layer on the first gap layer for facing a recording medium;

making a first hole in the first gap layer in the rear of the magnetoresistive element layer so as to reach the first magnetic material layer and forming a lower core layer extending from the first hole to on the magnetoresistive element layer by frame plating;

forming a second gap layer comprising a nonmagnetic material from on the lower core layer to on the first gap layer formed in a rear of the lower core layer;

forming a first insulating layer on the first gap layer in the rear of the lower core layer with the second gap layer therebetween and forming a coil layer on the first insulating layer; and forming a second insulating layer on the coil layer, and then forming an upper core layer on the second gap layer formed on the lower core layer to on the second insulating layer by frame plating, wherein before the second gap layer is formed, a second hole is made in the first gap layer on the first magnetic material layer in the rear of the section in which the coil layer is formed, a second magnetic material layer is formed on the first magnetic material layer through the second hole by frame plating, and the upper core layer is formed so as to be brought into contact with the second magnetic material layer.

4. A method of fabricating a thin film magnetic head according to claim 3, wherein the coil layer is formed in a double-layered structure, and at least a lower coil layer is formed in the rear of the lower core layer.

5. A method of fabricating a thin film magnetic head according to claim 3, wherein the first magnetic material layer and the second magnetic material layer comprise a magnetic material having higher saturation flux density than a saturation flux density of the lower shielding layer.

6. A method of fabricating a thin film magnetic head according to claim 3, wherein the first magnetic material layer and the second magnetic material layer comprise a magnetic material having higher resistivity than a resistivity of the lower shielding layer.

* * * * *